(12) United States Patent
Shen et al.

(10) Patent No.: US 7,640,549 B2
(45) Date of Patent: Dec. 29, 2009

(54) SYSTEM AND METHOD FOR EFFICIENTLY EXCHANGING DATA AMONG PROCESSES

(75) Inventors: Te-Cheng Shen, Santa Rosa, CA (US);
Robert Trosper, Healdsburg, CA (US);
Yu Wang, Santa Rosa, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 1313 days.

(21) Appl. No.: 10/200,867

(22) Filed: Jul. 22, 2002

(65) Prior Publication Data

US 2004/0015979 A1 Jan. 22, 2004

(51) Int. Cl.
*G06F 13/00* (2006.01)
(52) U.S. Cl. ........................ 719/313; 718/104
(58) Field of Classification Search ................. 709/220, 709/215; 712/13; 719/312, 313, 314; 718/104
See application file for complete search history.

(56) References Cited

U.S. PATENT DOCUMENTS

| | | | | |
|---|---|---|---|---|
| 4,644,496 | A * | 2/1987 | Andrews | 712/13 |
| 5,313,578 | A * | 5/1994 | Handorf | 719/314 |
| 5,894,560 | A * | 4/1999 | Carmichael et al. | 710/25 |
| 5,991,820 | A * | 11/1999 | Dean | 719/312 |
| 6,131,126 | A * | 10/2000 | Kougiouris et al. | 719/330 |
| 6,314,460 | B1 * | 11/2001 | Knight et al. | 709/220 |
| 6,823,387 | B1 * | 11/2004 | Srinivas | 709/227 |
| 6,829,769 | B2 * | 12/2004 | Cranston et al. | 719/312 |
| 6,847,991 | B1 * | 1/2005 | Kurapati | 709/213 |
| 6,848,106 | B1 * | 1/2005 | Hipp | 719/312 |
| 6,877,160 | B2 * | 4/2005 | Delatorre et al. | 718/104 |
| 6,938,085 | B1 * | 8/2005 | Belkin et al. | 709/227 |

OTHER PUBLICATIONS

"Optimizing Bulk Data Transfer Performance: A Packet Train Approach", by Cheng Song and Lawrence H. Landweber, 1988 ACM 0-89791-279-9/88/008/0134.*
"Microsoft Press Computer Dictionary," Third Edition, Microsoft Press, 1997; pp. 285, 286, 367 and 410.*
Silberschatz et al., "Applied Operating System Concepts," First Edition, John Wiley & Sons, Inc., 2000.*

* cited by examiner

*Primary Examiner*—Andy Ho (57) ABSTRACT

Disclosed are data communication techniques which facilitate data communication between multiple processes operable within a computing environment or environments and which may be implemented upon any of a plurality of operating systems without substantial modification or adaptation. The data communication techniques preferably provide communication between and among three or more processes simultaneously and processes may join and leave data communication conversations dynamically. A shared memory area is preferably defined into which data communicated between various processes is copied, thereby allowing a short pipe message to be communicated between processes while facilitating the transfer of large amounts of data without suspending operation of a transmitting and receiving processes for relatively long periods of time. Data communication is preferably arbitrated by an external arbitrator which may provide additional functionality such as process management such that when a process is unexpectedly terminated the process is automatically re-invoked and the communication channels re-established.

20 Claims, 6 Drawing Sheets

SYSTEM AND METHOD FOR EFFICIENTLY EXCHANGING DATA AMONG PROCESSES

TECHNICAL FIELD

The invention relates generally to performing multiple tasks in a computing environment and, more particularly, to the exchange of data among a plurality of computing environment processes.

BACKGROUND OF THE INVENTION

It is not uncommon today for computing environments to provide for multiple processes operating simultaneously, e.g., multitasking and multiprocessing. For example, many windows environments, such as Microsoft WINDOWS, provide for multitasking through time-sliced execution of multiple processes. Similarly, many layered operating systems, such as HP-UX (available in various forms from manufacturers such as Hewlett Packard Company, Santa Cruz Operation, Inc., and International Business Machines Corporation), provide for multitasking through time-sliced execution of multiple processes and for multiprocessing through dividing processes among multiple processing units.

It is often desirable to provide for exchange of data between the aforementioned multiple processes. For example, multiple processes may be implemented in processing information such that results from one process are aggregated or otherwise complied by another process, thereby requiring information communication between the processes. Similarly, processes may communicate information such as a current operational state, resource utilization information, etcetera among one another in order to facilitate desired computing operation.

Libraries have been developed for use with a particular corresponding operating system to facilitate data communication between multiple processes operable in that operating system environment. However, such development efforts, and the resulting libraries, have not been without difficulty and disadvantages. For example, it has been necessary in the past to develop unique libraries for each operating system due to the unique ways in which each such operating system functions and is configured.

One previous technique for providing data communication between multiple processes in a computing environment has been to implement a pipe, a link between one process' standard output to another process' standard input via the operating system kernel. However, the pipe buffer size is different from operating system to operating system. That is to say, for example, the pipe buffer size may be 32K on WINDOWS NT while the pipe buffer is 8K on HP-UX. Accordingly, if a process were to communicate 32 kilobytes of data in WINDOWS NT, a single pipe call with a single context switch could be executed for the transfer. However, if a similar process were to communicate the same 32 kilobytes of data in HP-UX, a single pipe call with a series of 4 context switches would be implemented.

These differences between the operating systems can require that each corresponding library be uniquely adapted for operation on the appropriate operating system. For example, different messaging protocols may be adopted depending upon the operating system, such as threads in a WINDOWS environment and signal handlers in a HP-UX environment.

Moreover, adaptation to enable a receiving process to identify data received via pipe transfers as part of a same data transmission may be desired in order to provide predictable results. For example, a pipe transmission from a third process may erroneously be interleaved between pipe transmissions of the aforementioned series of 4 context switches used to communicate 32 kilobytes of data.

Such implementation differences among the various operating systems has required the development, maintenance, and support of unique sets of code to implement communication among multiple processes on each operating system. For example, code for providing a process-to-process communication library call in HP-UX includes differences unique to that operating system requiring code for providing a process-to-process communication library call in WINDOWS to be substantially different. Therefore, although providing similar functionality, a duplication of resources is required for developing and maintaining libraries for each different operating system.

Performance using pipes for communicating data is often relatively poor as a process transmitting data via a pipe will be suspended from further processing by the operating system until the receiving process has fully received the pipe data. For example, where processes A and B are operable in a HP-UX environment and it is desired to communicate 32 kilobytes of data from process A to process B, process A may call a pipe to communicate the first 8 kilobytes of data. During the communication of the first 8 kilobytes of data the operating system will preempt process A so that process A has to wait until process B has fully received the first 8 kilobytes of data. The operating system will then release process A and process A can again call a pipe to communicate the second 8 kilobytes of data. During the communication of the second 8 kilobytes of data the operating system will again preempt process A. This continues until process A has "piped" all of the data to process B. Accordingly, it can be very slow and inefficient to implement pipes in providing data communication between such processes.

Further aggravating the above described inefficiencies, pipe transmissions are typically atomic if less than the pipe buffer size, but not if the pipe buffer is exceeded. Accordingly, process B has no way of detecting if the subsequent pipe transmissions are from process A, thereby supplementing the previous data, or from another process (e.g., process C) which fortuitously implements a pipe transmission to process B between the context switches of a pipe transmission from process A. Process B may be unable to determine that the received data is not all related and, therefore, further processing may be flawed or terminated. However, even where the receipt of such interleaved data is detected, process B would be required to establish communication with process A, such as via a pipe transmission, to request retransmission of the data. Such situations can result in unpredictable results and appreciable delays.

It should be appreciated that although particular operating systems such as WINDOWS, may provide a pipe buffer size suitable to accommodate the transmission of desired amounts of data using a single pipe call and/or single context switch, the implementation of such techniques for data transmission between processes is not without disadvantage. For example, as discussed above, process A operating in a WINDOWS environment would be preempted by the operating system during the transmission of the aforementioned 32 kilobytes of data until such time as process B has fully received the piped data. Accordingly, process A is suspended from further processing during the pipe transmission, resulting in relatively poor performance of the system.

A further disadvantage of the aforementioned pipe communications common among the various operating systems upon which the technique may be implemented is the copying of the data twice as it moves from the first process, through the operating system kernel, to the second process. For example, where pipes are used to transmit data from process A to process B, the operating system copies the data from process A to the kernel memory first then the operating system will copy the data from the kernel memory to process B's local memory. Moreover, the transfer of a large amount of data in particular operating systems, such as HP-UX discussed above, may implement the aforementioned series of context switches, further compounding the number of data copies involved.

BRIEF SUMMARY OF THE INVENTION

An embodiment of the invention establishes a method for providing data communication between a plurality of processes in a computing environment comprising invoking an arbitrator process to arbitrate communication between the plurality of processes, establishing a shared memory accessible to the plurality of processes, storing data to be transmitted from a first process of the plurality of processes to a second process of the plurality of processes in the shared memory, and sending a message including location information with respect to the data to be transmitted stored in the shared memory from the first process to the second process via the arbitrator process.

A method for providing data communication between a plurality of processes in a computing environment of an embodiment of the invention comprises invoking an arbitrator process to arbitrate communication between the plurality of processes, the arbitrator process invoking each process of the plurality of processes, the arbitrator process spawning a monitoring thread for each process of the plurality of processes, wherein the monitoring threads monitor an output of a main thread of a corresponding process of the plurality of processes, each process of the plurality of processes spawning a receiving thread wherein the receiving threads are configured to receive messages from the monitoring threads of the arbitrator process, establishing a shared memory accessible to the plurality of processes, storing data to be transmitted from a first process of the plurality of processes to a second process of the plurality of processes in the shared memory, and sending a message including location information with respect to the data to be transmitted stored in the shared memory from a main thread of the first process to a receiving thread of the second process via a monitoring thread of the arbitrator process.

A system for providing data communication between a plurality of processes of an embodiment of the invention comprises a plurality of processes for which data communication is to be provided, an arbitrator process, wherein said arbitrator process is a parent process to each process of the plurality of processes, a shared memory accessible to the plurality of processes, a library command operable by each process for causing a calling one of the plurality of processes to store data to be transmitted from the calling process to a receiving process of said plurality of processes in the shared memory and to send a message including location information with respect to the data stored in the shared memory from the calling process to the receiving process via the arbitrator process.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

The present invention is directed to systems and methods which provide an architecture, e.g., library or set of commands and associated resource protocols, to facilitate data communication between multiple processes operable within a computing environment. Directing attention to FIG. 1, process 101 (process A) is shown in bi-directional data communication with process 102 (process B) within computing environment 110. Processes for which data communication may be provided according to the present invention (e.g., processes 101 and 102) may include, for example, graphical user interface programs, terminal (console) programs, etcetera.

Figure 1:
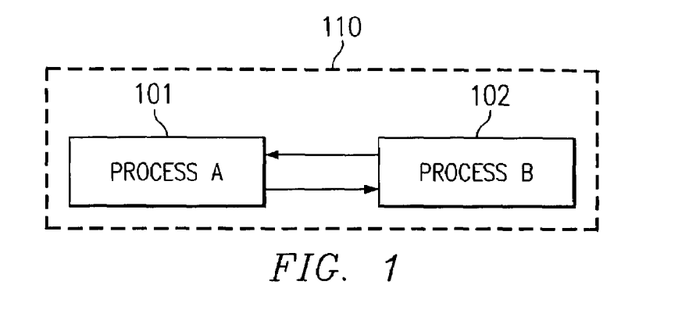
FIG. 1 shows two processes in bi-directional communication as may be provided according to an embodiment of the present invention.

Preferred embodiments of the present invention provide a data communication technique which may be implemented upon any of a plurality of operating systems without substantial modification or adaptation. For example, the library set of a most preferred embodiment is adapted for implementation on WINDOWS NT, WINDOWS 98, Hewlett Packard HPUX, IBM AIX, and Sun OS without alteration of the data communication techniques. Accordingly, computing environment 110 may comprise one or more of such operating systems.

Figure 2:
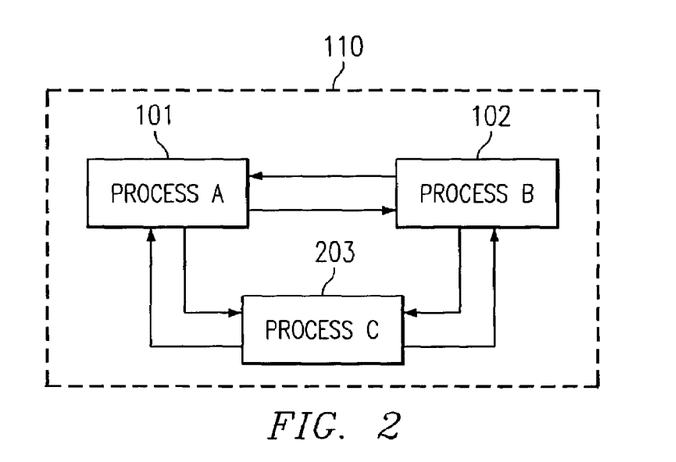
FIG. 2 shows three process in bi-directional communication as may be provided according to an embodiment of the present invention.

Data communication techniques utilized according to the present invention preferably provide communication between and among three or more processes simultaneously. For example, multiple transmitting processes may output data to be received by a same or different receiving process simultaneously according to embodiments of the present invention. Directing attention to FIG. 2, process 203 (process C) has joined the data communication conversation of processes 101 and 102 shown in FIG. 1 such that bi-directional data communication is established between each of processes 101, 102, and 203 according to the present invention. Preferably, data transmitted by each such transmitting process is managed such that the receiving process receives all data transmitted from a particular transmitting process as a unit. Accordingly processes may join and leave data communication conversations dynamically, according to embodiments of the present invention.

Preferably, data communication between multiple processes according to the present invention is provided such that data communication across different process boundaries is efficient. For example, preferred embodiments of the present invention minimize the number of copies and/or the number of operating system context switches utilized in transmitting data from one process to another. Data transmission between processes according to the present invention may be achieved with a minimum number of data copies.

According to a preferred embodiment of the present invention, a shared memory area is defined into which data communicated between various processes is copied, thereby providing access to the data to a receiving process without a second data copy. Preferably, the shared memory area is sized and/or partitioned to achieve efficiency according to the present invention. Accordingly, techniques implemented according to the present invention may provide a mechanism to disassemble large chunks of data at a transmitting process and reassemble the data at a receiving process.

A process is preferably not blocked, e.g., busy waiting on receive, or otherwise suspended from transmitting data to another process when that particular receiving process is performing some other task or is otherwise not ready to receive the data. Accordingly, once a transmitting process has completed output of the data to be communicated to another process, the transmitting process is free to perform other functions. Similarly, embodiments of the present invention preferably do not suspend operation of a process during the time a process is receiving transmitted data. Accordingly, preferred embodiments of the present invention implement a "callback" notification technique to inform a process that data has been provided for the process' receipt and, preferably, the informed process will handle the data when ready.

Embodiments of the present invention provide process management such that when a process is unexpectedly terminated ("crashed") or otherwise exited abnormally, the process is automatically re-invoked and the communication channels of the present invention are re-established. Preferably, such re-invoking and re-establishing is accomplished transparently with respect to other ones of the processes.

In providing a preferred embodiment inter-process data communication technique, the inventive architecture is applied to HP-UX and WINDOWS environments, as mentioned above. Accordingly, data communication and signaling mechanisms of one such environment for which there is no corresponding mechanism in the other such environment are preferably not implemented. For example, the HP-UX signal mechanism is not utilized according to a preferred embodiment of the invention as a corresponding mechanism is not widely available with respect to WINDOWS environments.

Both WINDOWS and HP-UX environments, however, support "pipe" as an inter-process communication mechanism, although the use of pipe is generally only feasible for small amounts of data exchange. For example, the pipe buffer is currently limited to 5120 bytes on Sun OS and 8190 bytes on HPUX (although the pipe buffer is adjustable in WINDOWS NT). If pipe is used to send 10 megabytes of data, for example, the pipe buffer is easily filled resulting in performance degradation and/or implementation disadvantages, e.g., all following write pipe function calls will be blocked until a receiving process has fully received the piped data.

Another approach for providing inter-process communication supported by both the WINDOWS and HP-UX environments is the use of shared memory. Moreover, the use of shared memory is typically not as restricted with respect to the size of the resource and, therefore, the amounts of data that may efficiently exchanged thereby. For example, in contrast to the above described restrictions with respect to pipe imposed by Sun OS and HPUX, Sun OS readily accommodates 512 MB of shared memory and HPUX readily accommodates 1024 MB of shared memory. Such shared memory limits exceed shared memory resources utilized according to a preferred embodiment of the present invention. For example, a preferred embodiment of the present invention utilizes approximately 100 MB of shared memory in WINDOWS and HP-UX environments to provide data communication between multiple processes.

A processing resource common to both WINDOWS and HP-UX is the concept of threads, a related sequence of instructions or actions within a process that runs at least in part independent of other actions within the process. Threads have been implemented in WINDOWS operating system environments for some time and the thread package has become a standard recently for HP-UX operating system environments such as HPUX and Sun OS. Although these thread interfaces are distinct to the host operating system, their functionalities are essentially the same, thereby allowing a same process-to-process data communication architecture to be implemented with respect to each such operating system using the concept of threads.

Threads may be spawned to facilitate communication between processes according to the present invention. For example, a receiving thread may be spawned at each of two processes to be placed in communication to receive data from the other process. Directing attention to FIG. 3, processes 101 and 102 are shown having spawned receiving threads 301 and 302, respectively, off of the main process threads. Using such a configuration, process A may communicate data to process B by the main thread of process A sending a message to the receiving thread of process B. Similarly, process B may communicate data to process A by the main thread of process B sending a message to the receiving thread of process A. However, this configuration becomes considerably more complicated when additional processes join the conversation.

Figure 3:
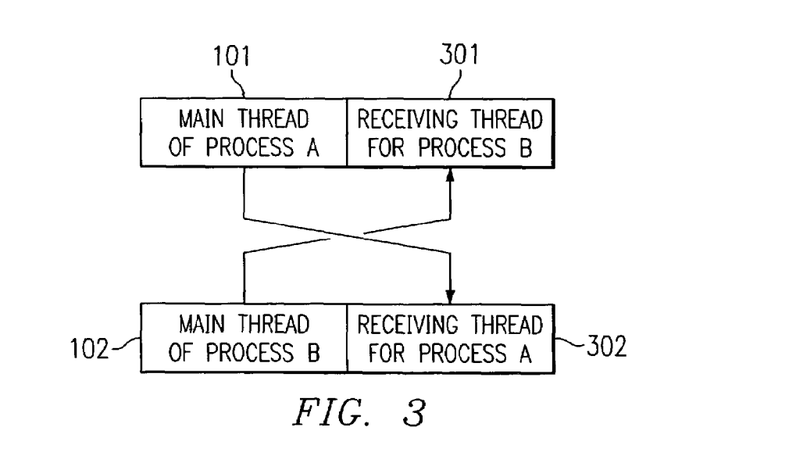
FIG. 3 shows use of receiving threads in providing process-to-process communication between two processes according to an embodiment of the present invention.
Figure 4:
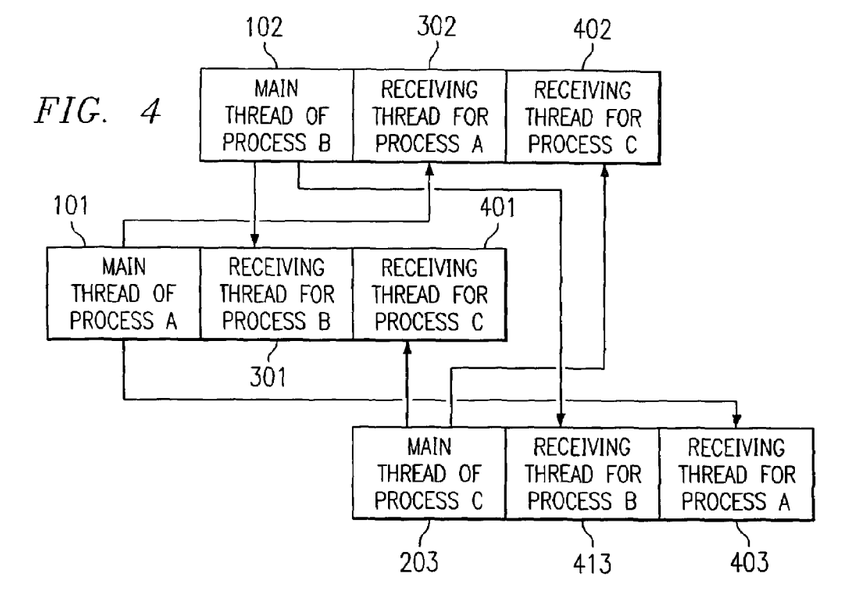
FIG. 4 shows use of receiving threads in providing process-to-process communication between three processes.

Directing attention to FIG. 4, it can be seen that introducing a third process into the conversation of FIG. 3 results in establishing 4 additional communication channels. Specifically, processes 101 and 102 spawn receiving threads 401 and 402, respectively, for receiving data from process 203 in addition to receiving threads 301 and 302 already spawned for receiving data from a corresponding one of processes 101 and 102. Similarly, process 203 spawns threads 403 and 413 for receiving data from processes 101 and 102, respectively. It should be appreciated that providing a receiving thread for each process in the conversation allows a transmitting process to avoid being suspended awaiting data transmission while a receiving process is busy with another task as the associated receiving thread will be dedicated to receipt of such data from the transmitting process.

However, in implementing such data communication, there should be some way of recognizing that another process is interested in joining this conversation and a mechanism for establishing the threads for establishing communications. It should be appreciated that these issues are compounded as more processes are added to the conversation. For example, an additional thread is created to listen to each additional channel such that if there are 6 processes in a conversation then there are 5 receiving threads in each process. Accordingly, where there are 6 processes involved in a conversation using threads as described above, there will be P(6,2)=30 more threads in the system. Similarly, where there are 10 processes involved in a conversation there will be P(10,2)=90 additional threads in the system. It can be readily appreciated that management of processes joining the conversation, as well as leaving the conversation, may be very complex in such a configuration.

Moreover, at some point the number of additional threads operating within the computing environment results in their implementation ceasing to be transparent to a user. Each such thread utilizes resources of the system and, therefore, affects the performance thereof. Accordingly, the threads utilized according to the present invention preferably occupy as few resources as is possible.

Figure 5:
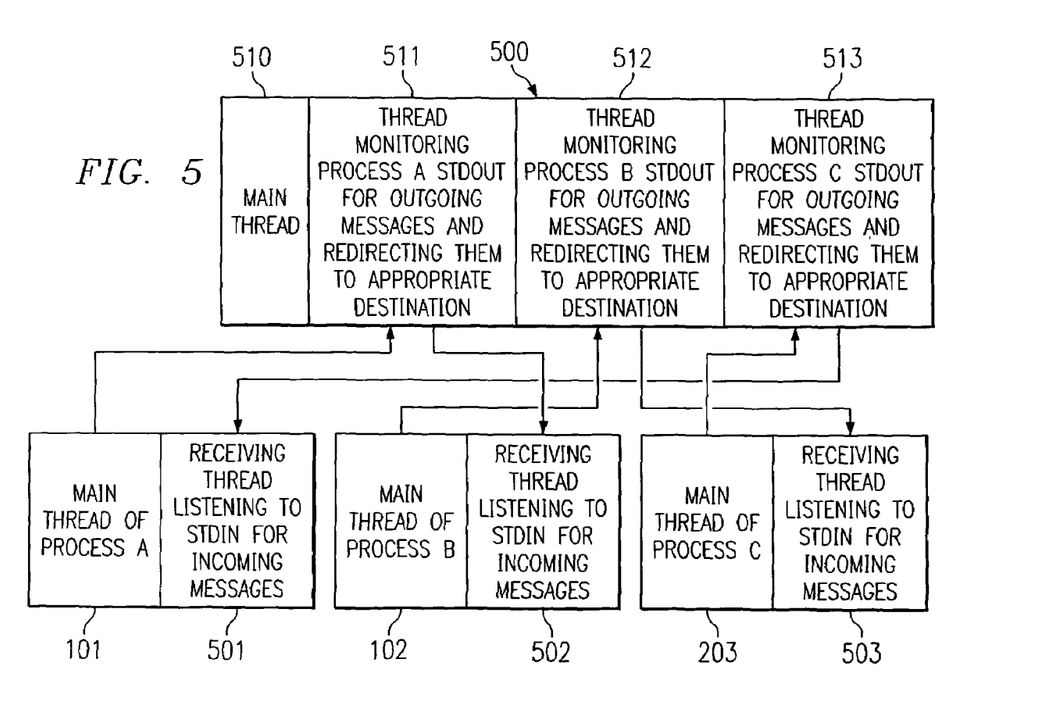
FIG. 5 shows use of receiving threads and a corresponding daemon in providing process-to-process communication between a plurality of processes according to an embodiment of the present invention.

Preferred embodiments of the present invention implement an external arbitrator, e.g., a software daemon, which directs data communication between the processes. Directing attention to FIG. 5, an architecture implementing an external arbitrator according to an embodiment of the present invention is shown. In the embodiment of FIG. 5, daemon 500 is operable in the operating system environment (e.g., WINDOWS or HP-UX) to establish and maintain data paths between various processes. Accordingly, daemon 500 includes monitoring/redirecting threads 511, 512, and 513, corresponding to processes 101, 102, and 203 respectively, spawned off of daemon main thread 510. Processes 101, 102, and 203 preferably have receiving threads 501, 502, and 503, respectively, for receiving data from daemon 500. Threads 501, 502, and 503 preferably receive messages for an associated one of the main processes, processes 101, 102, and 203 respectively. Accordingly, when the main thread is busy performing another task, such as updating the screen for example, the receiving thread is available to receive messages.

Daemon 500 preferably includes functionality, such as may be provided by the aforementioned monitoring/redirecting threads, to survey or monitor each process invoked by the daemon. Preferably daemon 500 is operable to reinstate processes which terminate abnormally.

In operation according to a preferred embodiment, daemon 500 is invoked or launched before any other processes which are to be placed into communication using daemon 500 (e.g., processes 101, 102, and 203) are invoked. Daemon 500 is preferably responsible for invoking or launching all such processes who wish to join any conversation hosted by the daemon. For example, each of processes 101, 102, and 203 may be launched by daemon 500 such that processes 101, 102, and 203 are child processes to parent process daemon 500. Additionally, processes 101, 102 and 203 may create other processes, to which communication according to the present invention is desired, by indicating such a desire to daemon 500, thereby allowing daemon 500 to invoke the desired new process as a child process of daemon 500. Accordingly, daemon 500 of the preferred embodiment facilitates the creation of new processes in real time and placing these processes in communication with any of the other processes for which daemon 500 is arbitrating communications.

Each of processes 101, 102, and 203 preferably direct transmission of data to a corresponding one of monitoring/redirecting threads 511, 512, and 513 which redirects the message to the appropriate destination process. Accordingly, when invoking a child process, daemon 500 preferably redirects the standard input (stdin) and standard output (stdout) of that process to establish communication links with daemon 500, using appropriate ones of the aforementioned monitoring/redirecting threads. Additionally, daemon 500 preferably creates a monitoring/redirecting thread (threads 511, 512, and 513) to listen to that child process' standard output and creates a receiving thread (threads 501, 502, and 503) to listen to the monitoring/redirecting thread's standard output. Daemon 500 may additionally save information with respect to the process, its configuration, and/or resource allocation for later use, such as to reinstate the process upon an abnormal termination.

It should be appreciated that in the embodiment of FIG. 5 data communication may be provided between each of the illustrated processes, including bi-directional communication sessions and communications between three or more processes, with substantially less threads being spawned by the processes than in the embodiment of FIG. 4. For example, if there are 10 processes in a conversation, then there are 20 additional threads in the embodiment of FIG. 5 instead of 90 in the architecture of FIG. 4. Accordingly, implementation of the external arbitrator according to the preferred embodiment will have a lesser impact upon the performance of each process placed in data communication according to the present invention.

Moreover, it should be appreciated that the external arbitrator architecture of the preferred embodiment provides synergism with respect to simplification of operational aspects. For example, there is one listening thread for each process. Accordingly, each time a process needs to send a message to another process, the transmitting process may simply send data to its standard output and the daemon will route the message to the appropriate destination.

However, operation of the external arbitrator architecture as illustrated in FIG. 5 is not without difficulty. Specifically, where the communication links between daemon 500 and processes 101, 102, and 203 are pipes and the messages transmitted via daemon 500 include the actual data to be transmitted between the processes, inefficiencies in the data communication may be experienced. For example, if process A transmits data to process B through daemon 500 using pipes, at least 6 data copies are involved with respect to the entire amount of data transmitted, i.e., the entire transmitted data set is copied from process 101 (process A) to the operating system kernel and from the kernel to monitoring/redirecting thread 511. The entire transmitted data set is again copied from monitoring/redirecting thread 511 to the operating system kernel and from the kernel to receiving thread 502.

It is expected that the entire transmitted data set will again be copied from receiving thread 502, via an internal pipe, to process 102 (process B).

The inefficiencies of such transfers of data are compounded where a relatively large amount of data is transmitted. For example, if process A is transmitting 10 MB of data to process B, a monitoring/receiving thread of daemon 500 reads in and parses the entire message to determine the proper destination. Reading and parsing such a large amount of data may require an appreciable amount of processing time. Moreover, such a message may be larger than the pipe buffer, such as where the pipe buffer is limited as discussed above. Such a situation would require multiple iterations of the above described transfers of data in order to transmit the entire data set. The performance issues may be further aggravated where a receiving process or thread is busy with another task and is unable to receive a piped message.

Figure 6:
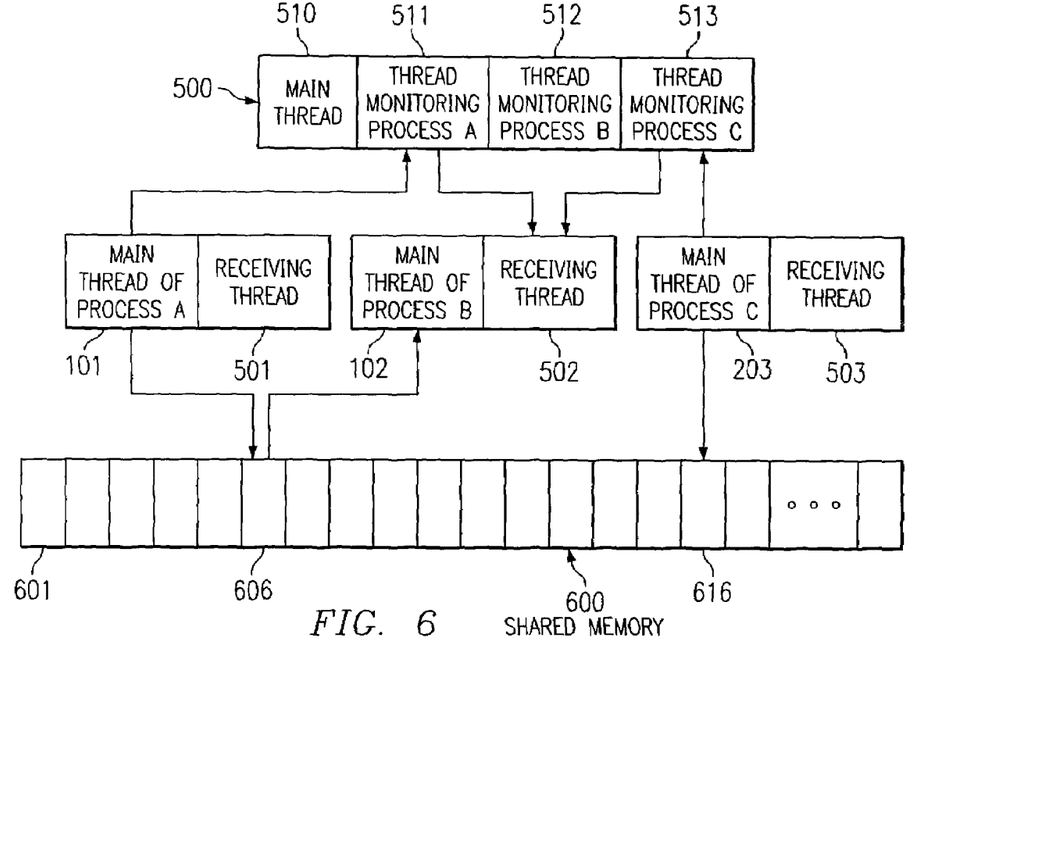
FIG. 6 shows use of shared memory in providing process-to-process communication between a plurality of processes according to an embodiment of the present invention.

Accordingly, preferred embodiments of the present invention utilize a shared memory space for the communication of data. A preferred embodiment architecture implementing an external arbitrator as illustrated in FIG. 5 as well as a shared memory space for the transfer of data between processes is shown in FIG. 6. It should be appreciated that in the architecture of FIG. 6 shared memory space 600 has been provided such that the processes for which communication is being arbitrated by daemon 500 may read and write data therefrom. Moreover, it should be appreciated that the shared memory of FIG. 6 is configured to accommodate multiple processes accessing (reading and/or writing) the shared memory simultaneously.

According to a preferred embodiment, the shared memory is approximately 128 megabytes in size. Although any size of shared memory may be utilized according to the present invention, simulation has indicated that 128 MB is an efficient size for use in transferring data in WINDOWS and HP-UX environments.

In the illustrated embodiment the shared memory is divided into a plurality of memory blocks, such as memory blocks 601, 606, and 616. Although any size of memory block may be utilized according to the present invention, a preferred embodiment of the present invention utilizes memory blocks of approximately 32 kilobytes in size.

Although division of the shared memory into such memory blocks is not a requirement of the present invention, and therefore may be omitted, the illustrated embodiment implements such a technique for compatibility reasons and/or to provide an easily managed memory addressing scheme. For example, processes and/or library calls existing in an operating system environment in which the present invention is to be implemented may support memory copies of pre-established block sizes. Matching memory block sizes within the shared memory of the present invention provides reliable backward compatibility with respect to such processes and library calls. Moreover, the use of such memory blocks provides a straight forward addressing scheme for identifying data transferred between processes according to the present invention.

In operation, when process A (process 101) needs to send a message to process B (process 102), process A preferably implements a library call of the present invention which copies data from process A's address space to shared memory 600, such as to memory block 606. The library call preferably sends a short message to daemon 500 to inform the receiving process, here process B, that data is being provided for transmission to process B. The short message transmitted to daemon 500 preferably includes such information as a location or locations within shared memory 600 the transmitted data may be found. Daemon 500 preferably redirects this short message to the appropriate destination, here process B, or more accurately receiving thread 502 of process B. Process B preferably receives this message (from receiving thread 502 in the illustrated embodiment) and determines where the transmitted data is located in the shared memory. This transmitted data may then be copied from the shared memory to the address space of process B, if desired.

According to the preferred embodiment, receiving thread 502 associated with process B listens to the communication channel from daemon 500 and receives the message from process A. Accordingly, even where process B is occupied with another task, receiving thread 502 is available to receive the short message. Preferably, the received messages are stored in an internal queue which is shared by the main thread and the receiving thread. Directing attention to FIG. 7, queue 702 shared by process B (process 102) and receiving thread 502 is shown. According to a preferred embodiment, the receiving thread can only place queue elements into the queue and the main thread can only consume queue elements from the queue.

Bi-directional communications may be established by process B invoking the aforementioned library call of the present invention to copy the appropriate data into another memory block of the shared memory and transmitting a short message to process A via daemon 500. Such bi-directional communication may be utilized for handshaking, acknowledgements, cooperative processing, etcetera. It should be appreciated that the architecture shown in FIG. 6 accommodates receiving messages from process A by process B while process B is transmitting messages to process A. Accordingly, embodiments of the present invention provide for efficient communications, even where process in the conversation are busy with other tasks.

It should be appreciated that in the preferred embodiment, pipe is only used to send and receive the aforementioned short messages. According to a most preferred embodiment the short messages are on the order of 4 bytes, thereby requiring very little time and resources to provide for their communication as outlined above. Accordingly, disadvantages associated with the use of pipes in transmitting data are avoided. For example, the amount of data which can be transmitted between processes before filling a pipe, even using the relatively small pipe buffers associated with particular versions of HP-UX, is increased as the pipe is used for transmission of short messages with the actual data being transferred via the shared memory. Each short message may have a substantially larger amount of data to be transferred associated therewith passed via the shared memory. Additionally, in the preferred embodiment, the number of copies associated with transmitting the actual data from one process to another are reduced. Moreover, the potential for suspension of processes due to pipe transfers as well as the duration of any such suspensions that might occur are minimized.

Figure 8:
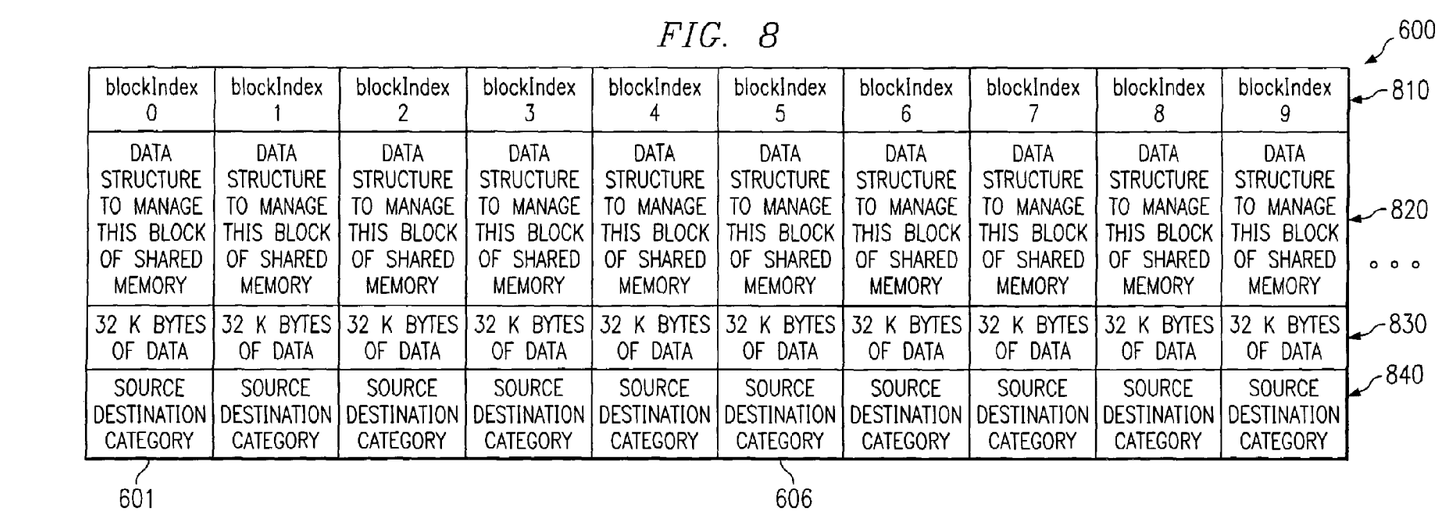
FIG. 8 shows a data structure of a shared memory utilized according to an embodiment of the present invention.

Directing attention to FIG. 8, detail with respect to a data structure of shared memory according to an embodiment of the present invention is shown. Each data block of shared memory 600 is shown to include a plurality of data fields. Specifically, data fields block index 810, data management 820, data 830, and data routing 840 are shown with respect to each data block of the shared memory. The blocks of shared memory 600 illustrated in FIG. 8 each store 32K bytes of data in the corresponding data fields (data 830) with other fields of the blocks being utilized to identify and manage the shared memory. According to this embodiment, a process would transmit data to another process 32K bytes at a time, implementing a data transmission function for each 32K bytes of data to be transferred. However, as discussed with respect to FIG. 6 above, there is no limitation upon the present invention utilizing 32K byte data blocks, or any other block size, and therefore other data block sizes may be utilized if desired.

Data field block index 810 preferably provides an identification index which is global to all processes utilizing the present invention. For example, block index "2" preferably has the same representation for process A and process B and, therefore, when process A informs process B that data is stored in block index 2 process B is able to identify and fetch the proper data.

Data management 820 preferably provides management with respect to the shared memory block. For example, data structures may be managed by data management 820 similar to heap management for conventional processes.

Data routing 840 of the preferred embodiment records the source, destination and category of data stored in the blocks. The source information may identify the process transmitting the data (e.g., process A), while the destination information identifies the process to which the data is being transmitted (e.g., process B). Category information may be utilized to communicate the type of data being transferred, the status of the data being transferred, the relative position in a series of the data being transferred, a use of the data being transferred, etcetera.

An embodiment of the present invention includes categories such as INVOKE, KILL, BEGIN, END, DATA, and ERROR. For example, when process A is attempting to create another process, it may use the category INVOKE. Once daemon 500 receives this message, it may not pass this message to another processes but instead may create a new process, e.g. process Z, on behalf of process A. When process A is attempting to kill another process, it may issue a transmission using the KILL category. Once daemon 500 receives this message, it may not pass this message to another processes, but instead, daemon 500 may kill a particular process, such as process Z, on behalf of process A. When there is anything wrong in the system (e.g. one process dies unexpectedly), daemon 500 may send messages to all processes having the ERROR category informing the remaining processes that some process has died so that the processes can know what is happening in the environment. When a process is attempting to send data larger than the data block size of the shared memory, e.g. 32 kilobytes, the data may be divided into the appropriately sized chunks. For example, if process A is attempting to send 64 kilobytes to process B, the data may be sent using 4 messages with the categories of BEGIN, DATA, DATA, END. This sequence informs daemon 500 that the data blocks should be delivered to the receiver indivisibly. Thus, when process C is also sending a message to process B, data sent by process A would not be corrupted.

In operation according to a preferred embodiment, when a process needs to transmit data to another process, a library call is made for each data block of the shared memory to be filled with a portion of the transmitted data. The library call may be of the form "send (destination, category, pointer to data, size of data)" and the called library function will assign a shared memory block, copy the data to be transmitted to the shared memory block, and send a message to the receiving process to inform that process of the transmitted data.

Figure 9A:
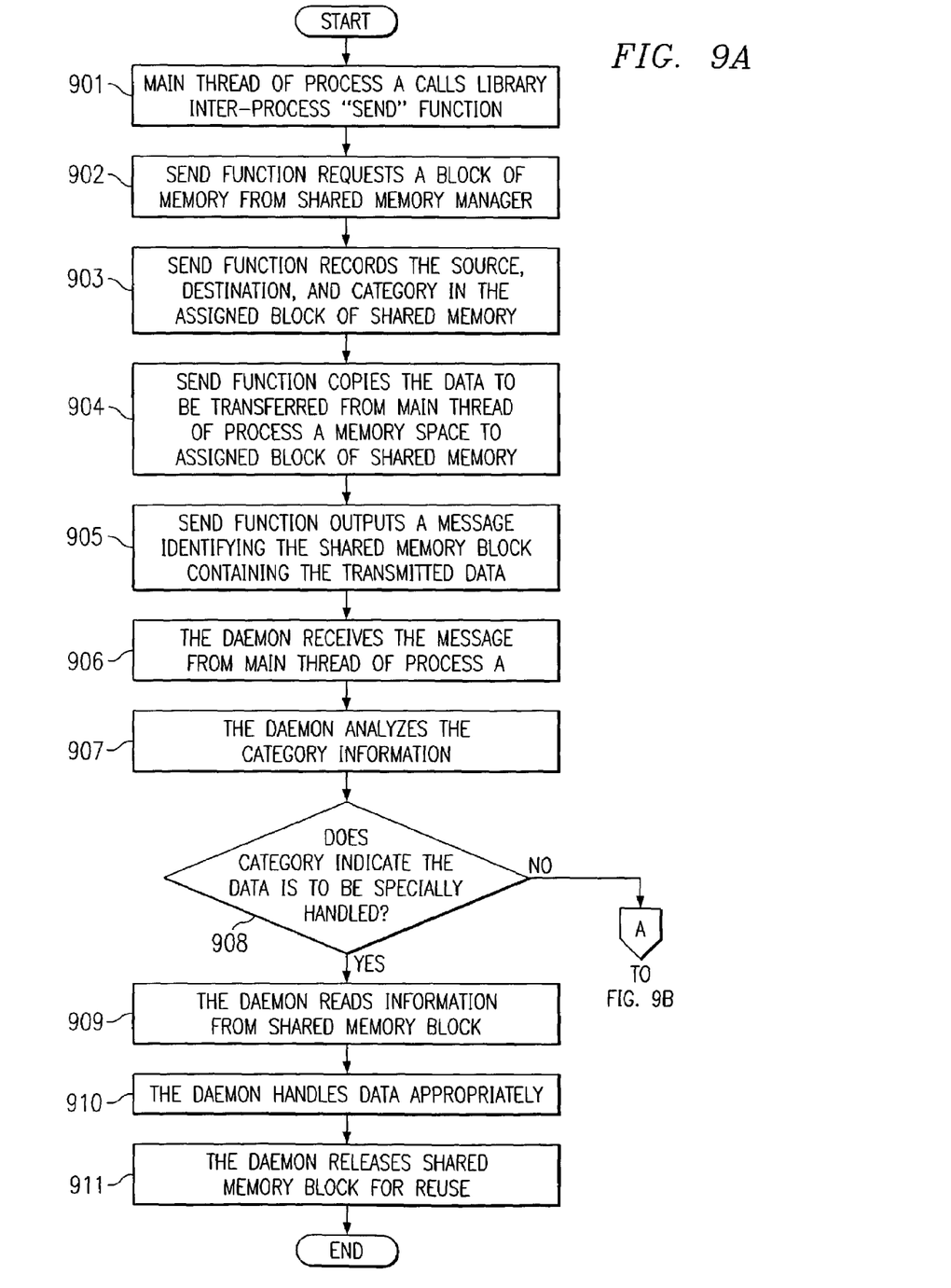
FIGS. 9A and 9B show a flow diagram of operation of process-to-process communication according to an embodiment of the present invention.
Figure 9B:
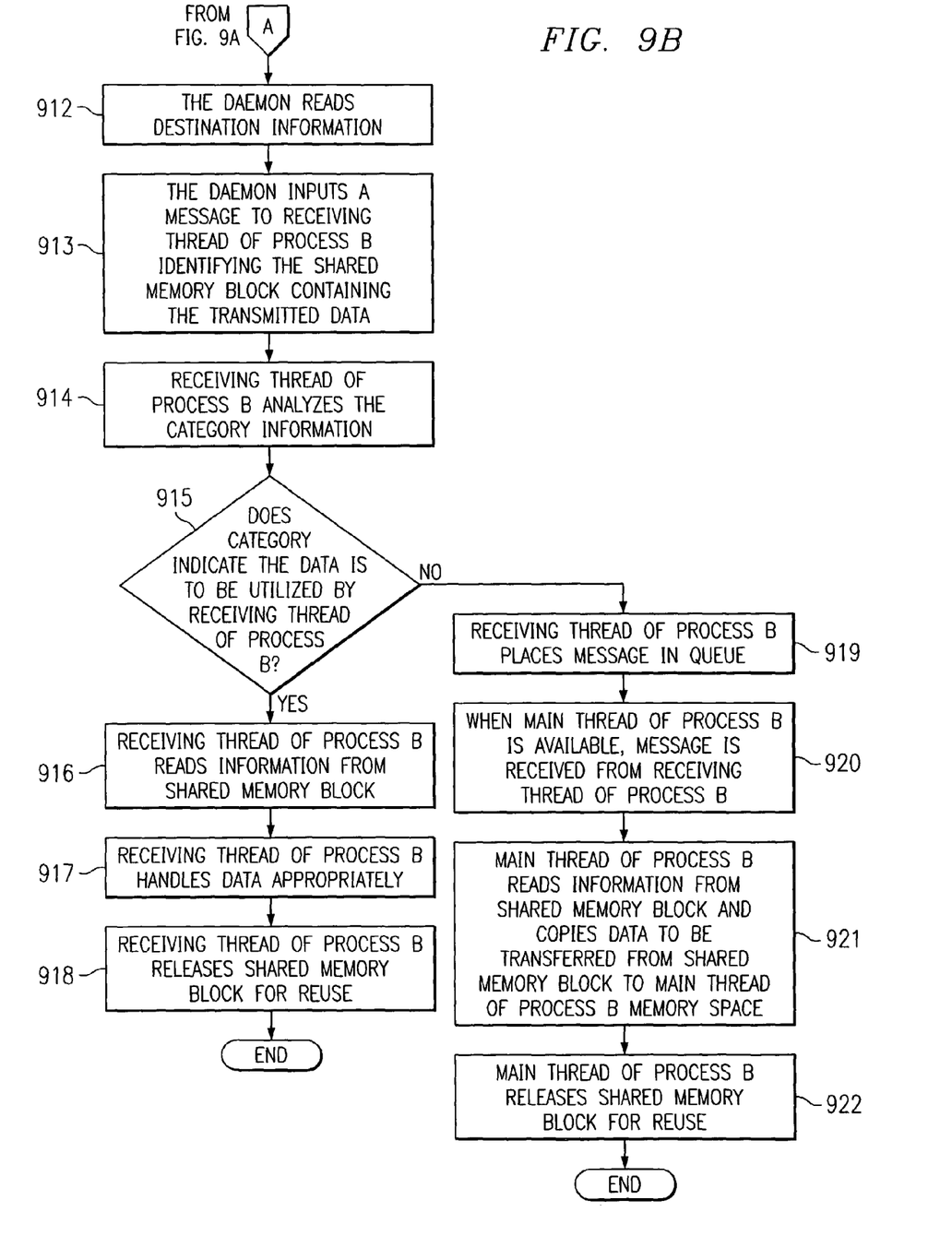

A flow diagram of operation according to an embodiment of the present invention using shared memory data structure as shown in FIG. 8 to transfer data between processes is shown in FIGS. 9A and 9B. At step 901 the main thread of a process transmitting data (here process A) calls a library "send" function of the present invention to invoke an inter-process transfer of data.

At step 902 the send function, preferably operable within process A, requests a block of memory of shared memory 600 from a shared memory manager (e.g. a set of function calls linked to all processes). The shared memory manager may reference a look up table or other information, such as information within data management 820, to identify an available block of shared memory for assigning to the data transfer. The send function receives information with respect to the available block of shared memory assigned for use in transmitting the data. This information may comprise a global memory location identifier, such as block index 810 of the assigned block. However, this information may comprise memory addresses, such as physical and/or logical addresses, not readily utilizable according to the present invention. Accordingly, the send function may operate to convert or translate the received information with respect to the assigned block of shared memory to a global memory location identifier.

At step 903 the send function records information identifying the source, information identifying the destination, and category information in the assigned block of shared memory, such as within data routing 840 of the assigned block. Similarly, at step 904 the send function copies the data to be transferred from memory space of the main thread of process A to the assigned block of shared memory, such as within data 830 of the assigned block.

At step 905 the send function causes the main thread of process A to output a message identifying the shared memory block containing the transmitted data. This message is preferably relatively short, such as a 4 byte integer providing the block index associated with the assigned memory block. The message is preferably output via the main thread of process A's standard out, which as discussed above is preferably monitored by a thread of daemon 500, using pipe. It should be appreciated that, upon transmission of the message, the transmitting process is preferably freed to perform any other desired tasks as the daemon and/or receiving process will preferably be tasked with the remainder of the steps of the data transfer.

Accordingly, at step 906 the thread of daemon 500 monitoring process A receives the message from the main thread of process A. It should be appreciated that according to this embodiment the data to be transmitted as well as the source, destination, and category information is not included in the message transmitted by process A, but rather is contained within the shared memory. The message transmitted by process A comprises information suitable for identifying the particular block of shared memory in which this information may be found.

At step 907 daemon 500 utilizes the received message to locate information with respect to the data to be transmitted for a determination as to how the data should be processed by daemon 500. For example, daemon 500 may analyze the category information of data routing 840 in order to determine if the data is to be utilized by daemon 500 or to be utilized by another process. Accordingly, embodiments of the present invention facilitate communications internal thereto, such as may be utilized for management, initialization, maintenance, or other functions associated with providing process-to-process communications.

If at step 908 it is determined that information with respect to the received message indicates the data is to be specially handled, e.g., consumed by daemon 500 itself, daemon 500 reads information from the shared memory block, such as from data 830, at step 909. At step 910 daemon 500 handles the transmitted data appropriately. For example, daemon 500 may utilize the data for configuring communication channels of the present invention. Preferably, special handling of such data by daemon 500 is accomplished utilizing the main thread of daemon 500, or another thread other than the thread monitoring standard out of process A, in order to minimize the risk that daemon 500 would be unavailable to receive a subsequent message from process A. Daemon 500 preferably releases the shared memory block for reuse, such as by updating a register of data management 820 and/or signaling the shared memory manager, at step 911. Release of the shared memory may be after daemon 500 has appropriately processed the transmitted data. However, according to a preferred embodiment, daemon 500 reads all of the information from the data block into memory space of the daemon and releases the memory block prior to completing processing of the transmitted data in order to minimize the use of the shared memory block by daemon 500.

If at step 908 it is determined that information with respect to the received message indicates the data is not to be specially handled, daemon 500 reads destination information from the shared memory block, at step 912. For example, daemon 500 may read destination information from data routing 840.

At step 913 daemon 500 inputs a message to the receiving thread of the receiving process (here process B) identifying the shared memory block containing the transmitted data. This message is preferably the same as that received from the transmitting process and, therefore, is relatively short, such as a 4 byte integer providing the block index associated with the assigned memory block. The message is preferably input via the receiving thread of process B's standard in, which as discussed above is preferably monitoring a thread of daemon 500, using pipe. It should be appreciated that, upon transmission of the message, daemon 500 is preferably freed to perform any other desired tasks as the receiving process will preferably be tasked with the remainder of the steps of the data transfer.

At step 914 the receiving thread of process B utilizes the received message to locate information with respect to the data to be transmitted for a determination as to how the data should be processed by the receiving thread of process B. For example, the receiving thread of process B may analyze the category information of data routing 840 in order to determine if the data is to be utilized by the receiving thread of process B or to be utilized by the main thread of process B. Accordingly, embodiments of the present invention facilitate communications internal thereto, such as may be utilized for management, initialization, maintenance, or other functions associated with providing process-to-process communications.

If at step 915 it is determined that information with respect to the received message indicates the data is to be utilized by the receiving thread of process B, the receiving thread of process B reads information from the shared memory block, such as from data 830, at step 916. At step 917 the receiving thread of process B handles the transmitted data appropriately. For example, the receiving thread of process B may utilize the data for configuring communication channels of the present invention. The receiving thread of process B preferably releases the shared memory block for reuse, such as by updating a register of data management 820 and/or signaling the shared memory manager, at step 918. Release of the shared memory may be after the receiving thread of process B has appropriately processed the transmitted data. However, according to a preferred embodiment, the receiving thread of process B reads all of the information from the data block into memory space of the receiving thread and releases the memory block prior to completing processing of the transmitted data in order to minimize the use of the shared memory block by the receiving thread of process B.

If at step 915 it is determined that information with respect to the received message indicates the data is to be transmitted to the main thread of process B, the receiving thread of process B places the message in its internal queue for acquisition by the main thread of process B at step 919. Preferably, entry of the message in the internal queue includes information with respect to the transmitting process. Accordingly, if the message received from the daemon does not include such information, preferred embodiments of the receiving thread may access the indicated memory block to include information with respect to the transmitting process in the queue. The receiving thread of process B may additionally or alternatively post an event to the main thread to indicate a message is waiting in the queue, if desired.

At step 920, when the main thread of process B is ready to receive the transmitted data, e.g., completed other tasks, the main thread of process B may retrieve the message from the queue. For example, when a posted event indicates a message is in the queue, a "callback" function of the present invention may be called when the main thread has completed other tasks to complete an inter-process transfer of data. The callback function, preferably operable within the main thread of process B, may receive a next or appropriate message from the queue indicating a shared memory block containing the desired transmitted data. Selection of a particular message from the queue may be based upon a previous block of data received, a particular action being performed by the process, etcetera. For example, where the category information of a previously received block of data did not indicate the block was an "END" block, the call back function may search the queue for a next message from the same process as the previously received data block.

At step 921 the callback function copies the data to be transferred from the assigned block of shared memory, such as within data 830 of the assigned block, to memory space of the main thread of process B. The main thread of process B may access additional information of the assigned block, such as information identifying the transmitting process as may be available within data routing 840 for use in processing the transmitted data. It should be appreciated that there is no requirement according to the present invention that a receiving process or thread copy or move data from the shared memory. For example, data may be utilized, searched, parsed, etcetera by a process or thread without copying the data into the memory space of the process or thread. According to an embodiment of the present invention, the main thread of process B, for example, will make a determination whether or not to move the data from shared memory, such as based upon the category information associated therewith.

The main thread of process B preferably releases the shared memory block for reuse, such as by updating a register of data management 820 and/or signaling the shared memory manager, at step 922. Release of the shared memory may be after the main thread of process B has appropriately processed the transmitted data. However, according to a preferred embodiment, the main thread of process B reads all of the information from the data block into memory space of the main thread and releases the memory block prior to completing processing of the transmitted data in order to minimize the use of the shared memory block by the main thread of process B.

It should be appreciated that, although described above with reference to a single sending and single receiving process, the present invention may be operated to provide communication with respect to any number of processes, simultaneously and/or serially. As can be readily appreciated from the assignment of shared memory blocks described above, multiple processes may write to/read from such shared memory simultaneously. Moreover, as the daemon provides threads for monitoring each thread for which communication is to be provided, such communications are facilitated without transmitting processes being suspended when processes are simultaneously transmitting data. Similarly, the receiving process's receiving thread queue facilitates orderly and managed receipt of transmitted data, even from multiple processes, at any particular receiving process.

Figure 7:
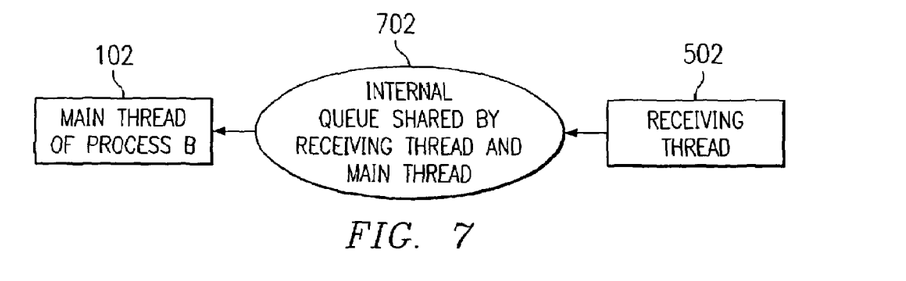
FIG. 7 shows a message queue shared between a main thread and receiving thread of a process according to an embodiment of the present invention.

Having described operation using shared memory according to an embodiment of the present invention, detail with respect to the aforementioned receiving process queue will be provided. Preferably, the internal queue is shared by the receiving thread and the main thread as illustrated in FIG. 7, discussed above. The internal queue is preferably comprised of two queues, referred to herein as new queue and old queue. This two queue architecture is preferred for providing efficient access, as will be better appreciated from the following discussion.

A scenario in which processes may be placed in communication according to the present invention may involve three processes (see FIG. 6). For example, process A and process B may be in communication such that process B has received data from process A, as described above, and process B may be performing a callback function for receiving data from process A. As discussed above, such a callback function is preferably called in the context of the main thread. Accordingly, the receiving thread of process B is available for receiving messages from other processes immediately after receiving the message from process A (via the daemon) and placing the message in the queue. For example, during performing the callback function by process B, process C may wish to send data to process B. According to the above described architecture, process C can send the appropriate messages to process B even if process B is busy performing some other tasks. The receiving thread of process B will receive those messages for the main thread.

Figures 10, 11:
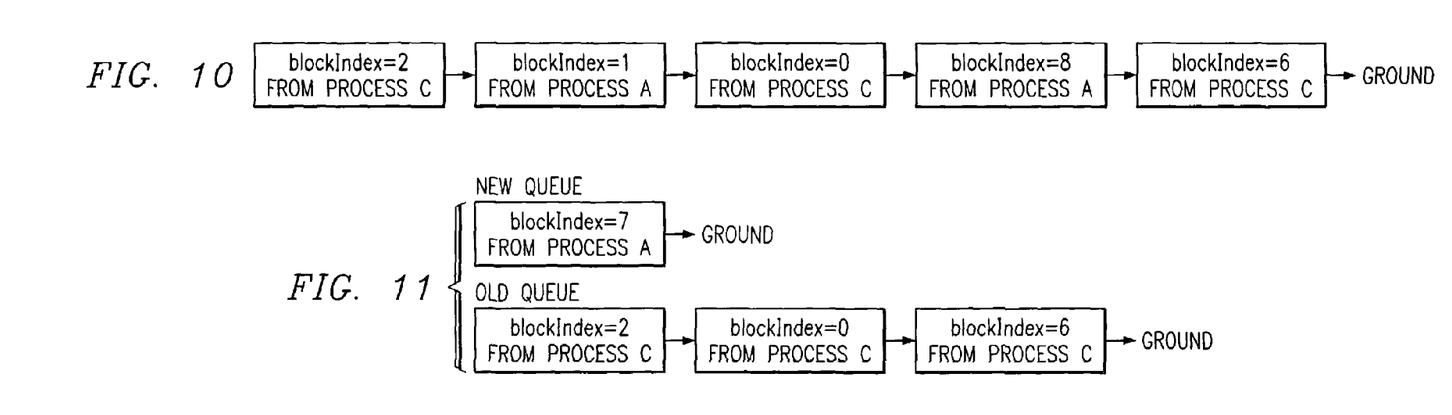
FIG. 10 shows a message queue according to an embodiment of the present invention.
FIG. 11 shows a message queue according to an embodiment of the present invention.

Directing attention to FIG. 10, an internal queue including a linked-list is shown. Using such a single linked-list, every time the main thread is attempting to retrieve data transmitted from a particular process, such as a series of related data blocks transmitted from process A to process B, it will typically be necessary to read each queue entry until an entry from the appropriate process, e.g., process A, is reached. For example, process B may invoke the aforementioned callback function which begins reading the queue at the first-in entry and continues to read the linked-list until an entry associated with a data transmission from process A is reached, in order to assemble several blocks of data transmitted by process A at process B. Where the queue is relatively lengthy, i.e., includes a large number of entries, searching of the queue for a next entry associated with a particular process may cause undesired processing delays. Moreover, another disadvantage of using a single linked-list is that, once the main thread is accessing the linked-list, the receiving thread is blocked with respect to writing additional entries to the queue. As shown above, accessing the queue by the main thread may require an appreciable amount of time, during which the receiving thread is blocked from writing to the queue and, thus, blocked from receiving additional messages.

Accordingly, the preferred embodiment internal queue includes two queues. Directing attention to FIG. 11, an internal queue implementing two queues according to a preferred embodiment of the present invention is shown. In operation according to a preferred embodiment, the receiving thread and main thread are each provided access to the new queue and only the main thread is provided access to the old queue. Periods in which the receiving thread is blocked from accessing the shared new queue are reduced as compared to the single linked-list discussed above through the main thread's use of the old queue.

Specifically, when the receiving thread is receiving a message, it stores it to the new queue. Whenever the main thread needs a specific message (e.g., a next message from process A), it searches the old queue first (it being appreciated that access to the old queue is available only to the main thread and, therefore, no conflict is possible between the receiving thread and the main thread). If the desired message (e.g., a next message from process A) is found in the old queue, the main thread removes the message from the queue and performs the appropriate function with respect thereto (e.g., the aforementioned callback function). If the main thread does not find the specific message it is searching for in the old queue (e.g., a next message from process A), it searches the new queue element by element and, if a particular element is not the one being searched for (e.g., messages from process C), moves the element to the end of old queue. If the desired message (e.g., a next message from process A) is located in the new queue, the main thread removes the message from the queue and performs the appropriate function with respect thereto (e.g., the aforementioned callback function). However, if the end of the new queue is reached and the desired message is not found (e.g., process A is still in the process of transmitting the next block of data), the main thread preferably sets a condition variable and the receiving thread wakes up the main thread when a new message is added to the new queue. Once the main thread wakes up, it searches for this new element in the new queue and, if this new message is the desired message (e.g., a next message from process A), the main thread removes the message from the queue and performs the appropriate function with respect thereto (e.g., the aforementioned callback function). If the new message is not the desired message, it is preferably placed into the old queue and the condition variable is again set.

It should be appreciated that when using the combination of the old queue and new queue, the main thread typically does not have to search very long in the new queue (the shared linked-list), as does the previous scenario, because messages are moved to the old queue as the new queue is searched. Accordingly, the main thread's access with respect to the new queue will typically be relatively short (e.g., the first message in the new queue will often be the desired message as the undesired messages, will be removed to the old queue in a previous pass), thus the receiving thread will not be blocked for a long period of time and will be ready to receive incoming messages most of the time. Moreover, when the main thread is ready to fetch messages associated with a different process (e.g., from process C) these messages will likely be consolidated in the old queue and, thus, the receiving thread is not blocked with respect to the queue because the main thread will likely be accessing the old queue. This approach can result in significant reductions in processing time as well as minimizing the likelihood that the receiving thread will be blocked from accessing the queue.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for providing data communication between a plurality of processes, comprising at least three processes, in a computing environment, said method comprising:
    invoking an arbitrator process to arbitrate communication between said plurality of processes;
    establishing a shared memory accessible to said plurality of processes;
    storing data to be transmitted from a first process of said plurality of processes to a second process of said plurality of processes in said shared memory; and
    sending a first message including a location of said stored data in said shared memory from said first process to said arbitrator process, said arbitrator process subsequently sending a second message including said location to said second process;
    wherein said arbitrator process is distinct from said plurality of processes; and
    wherein said stored data are neither received by nor transmitted from said arbitrator process; and
    wherein said stored data comprise data other than location data.

2. The method of claim 1, further comprising:
    spawning a receiving thread at each process of said plurality of processes, wherein said receiving threads are configured to receive said message from said arbitrator process.

3. The method of claim 1, wherein said message is transmitted from said first process to said arbitrator process using a pipe facility of said computing environment.

4. The method of claim 1, further comprising:
    spawning a reinstate thread at said arbitrator process, wherein said reinstate thread monitors each process of said plurality of processes to reinstate said processes upon an abnormal termination.

5. The method of claim 1, further comprising:
    storing data to be transmitted from a third process of said plurality of processes to said second process of said plurality of processes in said shared memory; and
    sending a third message including location information with respect to said data to be transmitted stored in said shared memory from said third process to said second process via said arbitrator process.

6. A method for providing data communication between a plurality of processes in a computing environment, said method comprising:
    invoking an arbitrator process to arbitrate communication between said plurality of processes;
    establishing a shared memory accessible to said plurality of processes;
    storing data to be transmitted from a first process of said plurality of processes to a second process of said plurality of processes in said shared memory;
    sending a message including location information with respect to said data to be transmitted stored in said shared memory from said first process to said second process via said arbitrator process; and
    spawning a monitoring thread at said arbitrator process for each process of said plurality of processes.

7. The method of claim 6, wherein said sending a message comprises said monitoring threads receiving messages including location information from a corresponding process and forwarding said messages to an appropriate process of said plurality of processes.

8. The method of claim 7, wherein said monitoring threads make a determination with respect to how said messages are to be handled, wherein said determination is based at least in part on information stored in said shared memory.

9. The method of claim 8, wherein said information stored in said shared memory comprises category information associated with said data to be transmitted.

10. A method for providing data communication between a plurality of processes, comprising at least three processes, in a computing environment, said method comprising:
    invoking an arbitrator process to arbitrate communication between said plurality of processes;
    establishing a shared memory accessible to said plurality of processes;
    storing data to be transmitted from a first process of said plurality of processes to a second process of said plurality of processes in said shared memory;
    sending a first message including a location of said stored data in said shared memory from said first process to said arbitrator process, said arbitrator process subsequently sending a second message including said location to said second process;
    spawning a receiving thread at each process of said plurality of processes, wherein said receiving threads are configured to receive said message from said arbitrator process; and
    sharing a message queue between a main thread of each process of said plurality of processes and a corresponding one of said receiving threads;
    wherein said arbitrator process is distinct from said plurality of processes; and
    wherein said stored data are neither received by nor transmitted from said arbitrator process.

11. The method of claim 10, wherein said message queue includes a first linked-list of which is accessible to both said main thread and said receiving thread and a second linked-list of which is accessible only to said main thread.

12. A method for providing data communication between a plurality of processes in a computing environment, said method comprising:
    invoking an arbitrator process to arbitrate communication between said plurality of processes;
    establishing a shared memory accessible to said plurality of processes;
    storing data to be transmitted from a first process of said plurality of processes to a second process of said plurality of processes in said shared memory; and
    sending a message including location information with respect to said data to be transmitted stored in said shared memory from said first process to said second process via said arbitrator process;
    storing data to be transmitted from a third process of said plurality of processes to said second process of said plurality of processes in said shared memory; and
    sending a message including location information with respect to said data to be transmitted stored in said shared memory from said third process to said second process via said arbitrator process;

wherein said steps of storing data to be transmitted are performed substantially simultaneously without suspending operation of said first or third processes.

13. A method for providing data communication between a plurality of processes in a computing environment, said method comprising:
- invoking an arbitrator process to arbitrate communication between said plurality of processes;
- establishing a shared memory accessible to said plurality of processes;
- storing data to be transmitted from a first process of said plurality of processes to a second process of said plurality of processes in said shared memory; and
- sending a message including location information with respect to said data to be transmitted stored in said shared memory from said first process to said second process via said arbitrator process;
- storing data to be transmitted from a third process of said plurality of processes to said second process of said plurality of processes in said shared memory; and
- sending a message including location information with respect to said data to be transmitted stored in said shared memory from said third process to said second process via said arbitrator process;
- wherein said steps of sending a message are performed substantially simultaneously without suspending operation of said first or third processes.

14. A method for providing data communication between a plurality of processes in a computing environment, said method comprising:
- invoking an arbitrator process to arbitrate communication between said plurality of processes;
- invoking, by said arbitrator process, each said process of said plurality of processes;
- spawning a monitoring thread at said arbitrator process for each process of said plurality of processes, wherein said monitoring threads monitor an output of a main thread of a corresponding process of said plurality of processes;
- spawning a receiving thread at each process of said plurality of processes, wherein said receiving threads are configured to receive messages from said monitoring threads of said arbitrator process;
- establishing a shared memory accessible to said plurality of processes;
- storing data to be transmitted from a first process of said plurality of processes to a second process of said plurality of processes in said shared memory; and
- sending a message including location information with respect to said data to be transmitted stored in said shared memory from a main thread of said first process to a receiving thread of said second process via a monitoring thread of said arbitrator process.

15. The method of claim 14, wherein said location information of said message is provided to a main thread of said second process by said receiving thread of said second process and said main thread of said second process utilizes said location information to retrieve said data from said shared memory.

16. The method of claim 14 further comprising: sharing a message queue between a main thread of each process of said plurality of processes and a corresponding one of said receiving threads, wherein messages received from said arbitrator process by said receiving threads are queued for access by a corresponding main thread in said message queue.

17. The method of claim 16, wherein said message queue includes a first linked-list of which is accessible to both said main thread and said receiving thread and a second linked-list which is accessible only to said main thread.

18. A system for providing data communication between a plurality of processes, comprising at least three processes, in said system comprising:
- a plurality of processes for which data communication is to be provided;
- an arbitrator process, wherein said arbitrator process is a parent process to each process of said plurality of processes, said parent process invoking or launching each process of said plurality of processes;
- a shared memory accessible to said plurality of processes; and
- a library command operable by each said process for causing a calling one of said plurality of processes to store data to be transmitted from the calling process to a receiving process of said plurality of processes in said shared memory and to send a first message including a location of said stored data in said shared memory from said first process to said arbitrator process, said arbitrator process subsequently sending a second message including said location to said second process; wherein said arbitrator process is distinct from said plurality of processes; and wherein said stored data are neither received by nor transmitted from said arbitrator process.

19. A system for providing data communication between a plurality of processes, said system comprising:
- a plurality of processes for which data communication is to be provided;
- an arbitrator process, wherein said arbitrator process is a parent process to each process of said plurality of processes;
- a shared memory accessible to said plurality of processes; and
- a library command operable by each said process for causing a calling one of said plurality of processes to store data to be transmitted from the calling process to a receiving process of said plurality of processes in said shared memory and to send a message including location information with respect to said data stored in said shared memory from said calling process to said receiving process via said arbitrator process;
- wherein said arbitrator process comprises: a monitoring thread for each process of said plurality of processes.

20. The system of claim 19, wherein each said process of said plurality of processes comprises:
- a receiving thread, wherein said receiving threads are configured to receive said message from said arbitrator process.

* * * * *